United States Patent [19]

Timmons

[11] Patent Number: 4,783,265

[45] Date of Patent: Nov. 8, 1988

[54] WATER TREATMENT

[75] Inventor: Alban Timmons, Beverley, United Kingdom

[73] Assignee: Hydro International Limited, Clevedon, United Kingdom

[21] Appl. No.: 925,500

[22] Filed: Oct. 29, 1986

Related U.S. Application Data

[63] Continuation of Ser. No. 721,914, Apr. 11, 1985, abandoned.

[30] Foreign Application Priority Data

Apr. 11, 1984 [GB] United Kingdom ............... 8409410

[51] Int. Cl.$^4$ ................................................. C02F 1/56
[52] U.S. Cl. ..................................... 210/666; 210/667; 210/725; 210/727; 210/728
[58] Field of Search ........ 210/666, 667, 716, 724–728, 210/732–734; 252/180, 181

[56] References Cited

U.S. PATENT DOCUMENTS

| | | | |
|---|---|---|---|
| 3,493,499 | 2/1970 | Zeitoun et al. | 210/727 |
| 3,575,854 | 4/1971 | Richards | 210/724 |
| 3,578,586 | 5/1971 | Gal et al. | 210/725 |
| 3,680,698 | 8/1972 | Liu et al. | 210/907 |
| 3,697,420 | 10/1972 | Blaisdell et al. | 210/728 |
| 3,737,037 | 6/1973 | Bone | 210/734 |
| 3,738,933 | 6/1973 | Hollo et al. | 210/727 |
| 3,953,330 | 4/1976 | Tonkyn et al. | 210/728 |
| 4,279,756 | 7/1981 | Weiss et al. | 210/667 |
| 4,415,467 | 11/1983 | Piepho | 210/728 |
| 4,425,238 | 1/1984 | Degen et al. | 210/728 |
| 4,450,092 | 5/1984 | Huang | 210/728 |

FOREIGN PATENT DOCUMENTS

| | | | |
|---|---|---|---|
| 53-99656 | 9/1983 | Japan | 210/728 |
| 58-159814 | 9/1983 | Japan | 210/728 |
| 516706 | 1/1940 | United Kingdom . | |
| 2095226 | 9/1982 | United Kingdom . | |

Primary Examiner—Peter Hruskoci
Attorney, Agent, or Firm—Larson and Taylor

[57] ABSTRACT

A method of treating water comprises adding to the water a composition comprising a weighting agent and an electrolyte having a multivalent metal cation.

The resultant floc absorbs suspended solids in the water and gives rise to a dense sludge which is easily removed from the purified supernatant liquor. A composition for use in the method is also disclosed. The composition may be in the form of a slurry or a friable solid (which may be briquetted).

14 Claims, No Drawings

WATER TREATMENT

This application is a continuation of application Ser. No. 721,914 filed Apr. 11, 1985, now abandoned.

BACKGROUND OF THE INVENTION

This invention relates to water treatment, and particulalry, although not exclusively, to the treatment of waste water containing organic particles such as sewage.

PRIOR ART

British Patent Application No. 8208603 (Ser. No. 2095226) discloses a composition for conditioning an aqueous system, the composition comprising particles of an alkaline earth metal hydroxide and an anionic oligomeric polyelectrolyte. This composition tends to raise the pH of the aqueous system to which it is added, particularly if the aqueous system comprises relatively soft water. Furthermore, the alkalinity of the composition may have a destabilising effect on the anionic oligomeric polyelectrolyte which means that the effectiveness of the composition tends to deteriorate with time.

SUMMARY OF THE PRESENT INVENTION

According to the present invention there is provided a method of treating water comprising adding to the water a composition comprising a weighting agent and an electrolyte having a multivalent metal cation.

The electrolyte having a multivalent metal cation may be ferric sulphate or ferric chloride and acts as a coagulant by forming the hydroxide of the metal cation which absorbs suspended solids in the water being treated.

In addition to the ferric sulphate or ferric chloride, or instead of it, the electrolyte may comprise aluminium sulphate which provides further cations to aid coagulation.

The weighting agent is preferably calcium sulphate in the form of a moderately finely divided powder.

The composition preferably also comprises a clay, for example a montmorillonite such as bentonite (available under the name FULBENT), or a kaolinite. Such materials have the ability to absorb large quantities of water into their structure. Consequently, by adjusting the quantity of, for example, bentonite, the composition may be in the form of a pumpable slurry or in the form of a friable solid. In the latter case, the composition may take the form of briquettes. The mixture may also be solidified by the addition of an organic titanate such as that employed to solidify paints.

The effect of the calcium sulphate is to absorb some organic matter from the water to be treated and to provide weight to suspended solids formed by the action of the electrolyte, so as to speed up separation and sedimentation.

It will be appreciated that the composition used in the method of the present invention tends to lower the pH of the water to which it is added. In some cases, it may be desirable to add lime (calcium hydroxide) or calcium carbonate to the system in order to prevent the pH from falling too far. Preferably, the pH should not fall below 5.5.

The composition may also include an anionic or cationic polyelectrolyte in order to assist flocculation of suspended particles. The acidity of the composition is then an advantage, particularly when an anionic polyelectrolyte is used, because this has a stabilising effect on the polyelectrolyte.

The fact that, in particular, the cationic polymer stabilises the composition is unexpected; it would normally be expected to destabilise such a composition. It is theorized that, in a concentrated solution, the polymer recoils and remains so until diluted into use.

Thus, a preferred composition in accordance with the present invention comprises an aqueous slurry containing ferric sulphate, calcium sulphate dihydrate, bentonite and a cationic polyelectrolyte. The composition may also contain aluminium sulphate.

Where the composition comprises ferric chloride or ferric sulphate as the electrolyte, the composition is preferably added to the water to be treated at the rate of 30–50 parts per million of ferric chloride or ferric sulphate. The overall dosage is preferably up to 100 parts per million of dry solids of the composition. In some instances higher dosages may be required. By contrast, the likely dosage rate required in the process of British Patent Application No. 8208603 under comparable conditions is in most cases about 200 parts per million. In soft waters very low dosages of the new composition will suffice.

The method of the present invention may be utilized with a split-dosing technique. A very small (for example 1 ppm) first dose is added to the water to be treated, followed by a second larger dose. Such a split-dosing technique reduces the total amount of composition used when compared with a single dosing technique; the resulting sludge is denser and the supernatant liquor is clearer. The first dose is believed to act as a pre-nucleating agent providing many nuclei about which the floc forms on addition of the second dose.

DETAILED DESCRIPTION OF THE INVENTION BY REFERENCE TO EXAMPLES

Two compositions in accordance with the present invention were prepared as follows:

COMPOSITION A 100 mls of a solution of ferric sulphate containing 60 grams of ferric sulphate was treated with 0.6 grams of cationic polymer previously dissolved in water. After an initial rise in viscosity the mixture thinned and stabilised. To this mixture 60 grams of calcium sulphate dihydrate was added. A stable pumpable slurry was formed even with gentle mixing. A further addition of 20 grams of bentonite was made with gentle stirring. A stable viscous slurry was formed. The mixture now contained.

60 grams Ferric Sulphate
60 grams Calcium Sulphate dihydrate
0.6 grams Cationic polymer (chemifloc Y40)
20 grams Bentonite
100 grams Water.

The mixture remained pumpable and stable and readily reactive even after several days. Tests indicate a probable stability of several months.

COMPOSITION B

Composition B was prepared in much the same way as Composition A, except that half of the ferric sulphate was replaced by aluminium sulphate. The resulting slurry was more mobile than composition A and again proved stable and reactive after several days. Composition B contained:

30 grams Aluminium Sulphate 30 grams Ferric Sulphate
60 grams Calcium Sulphate Dihydrate
0.6 grams Cationic polymer (chemifloc Y40)
20 grams Bentonite
100 grams Water.

Tests were carried out on samples of sewage from Derby domestic sewage pumping station to compare the coagulative and clarification properties of compositions A and B with ferric sulphate used alone. The results were as follows:

(1) 200 ppm of ferric sulphate were required to induce flocculation. The floc formed slowly and a turbid supernatant liquid was formed and remained even after 30 minutes settling.

(2) 200 ppm of composition A gave rapid floc formation (floc formed in 2 minutes) and even after only 10 minutes settling a clear supernatant liquor formed in which the suspended solids were less than half that in the sample treated with ferric sulphate alone.

(3) Composition B was used at a dose of 200 ppm and floc formation commenced within 1 minute of addition. The supernatant liquor formed more quickly than that in either (1) or (2) and the final liquor was the clearest of the three tests.

The tests demonstrated that, even on a difficult sewage, compositions A and B were superior to straight ferric sulphate treatment and at far lower dosages of multivalent cationic coagulants.

(4) A further test compared ferric sulphate alone with composition A, both applied at 200 ppm to an effluent comprising a heavy mixture of finely divided coal and sand. This test showed that sedimentation could be induced in half the time by composition A and the resultant sludge was reduced in volume by more than 10% compared with that achieved by ferric sulphate alone.

Further tests were carried out on raw water from an upland peaty source, high in colour but low in hardness. Such raw water required 45 ppm of aluminium sulphate to effect good coagulation and effective colour removal in both beaker tests and in plant practice. When the water was treated with material prepared in the manner described above as composition A the same colour removal could be effected, but at a more rapid rate with only 35 ppm of the composition based on solids content. When material prepared as composition B was applied only 30 ppm of the composition was required to achieve a similar result.

When treatment was performed using a split-dosage technique, further reductions in charges could be effected. Thus, when 1 ppm of composition A was applied followed by 30 minutes of slow stirring, a second dose of 30 ppm of the same composition gave rapid floc formation and the formed floc settled very rapidly. The settled supernatant liquor was less coloured than in any of the examples given above.

Using the split-dosage technique with composition B it was shown that 1 ppm of the composition followed by 30 minutes slow stirring and a further application of 25 ppm of the composition gave even better results than those above.

In all cases, treatment with compositions A and B gave a denser sludge than the coagulating agents when used alone.

The economies shown above can be further enhanced and the system readily controlled even in fluctuating conditions when under the control of a Streaming Current Detector (as supplied by L'Eau Clair Corporation). By combining treatment with compositions A and B with effective dosage control using a Streaming Current Detector, effective potable water treatment plants can be builtin very small sizes. Since rapid flocculation can now be produced, especially in a 'split-dose' system and control maintained, reliable potable water plants can be based, for example, on the separator disclosed in our UK Patent No. 2082941. Such plants can be portable and the whole system will produce drinking and domestic water for up to 1,000 people from a separator as small as 2 meters in diameter.

By combining the use of a small separator as a preliminary solids removal in the feed to the Streaming Current Detector instrument, direct control of effective dosage of the compositions can be achieved in potable watertreatment, sewage treatment and effluent treatment with great accuracy, independently of manual control and independently of pH. This will allow far greater and economical control to be achieved and the clarified liquor will be of a high quality, i.e. closer to prescribed limits, and such quality can be predicted and maintained.

The compositions in accordance with the present invention facilitate treatment of potable waters, sewage and effluents by means of one combined composition which is easy to deliver, handle and supply and which may be tailored to suit individual requirements over a wide range of usage. This is of particular importance in small unmanned works and where sophisticated technical supervision is not available.

I claim:

1. A method of treating water to remove solids including organic particles suspended therein comprising
    (i) adding to the water a sufficient amount of a composition to flocculate and separate said solids from the water to yield a substantially clear supernatant, the composition comprising: an electrolyte in an amount sufficient to coagulate suspended solids in the water being treated, said electrolyte being selected from the group consisting of iron (III) sulfate, iron (III) chloride, and aluminum (III) sulfate; calcium sulphate weighting agent in an amount sufficient to provide weight to suspended solids formed by the action of the electrolyte; and a cationic or anionic polyelectrolyte;
    (ii) permitting said solids to flocculate and separate from the water supernatant; and
    (iii) removing the separated, flocculated solids from the supernatant.

2. A method according to claim 1, wherein the electrolyte comprises iron (III) sulphate.

3. A method according to claim 1, wherein the electrolyte comprises iron (III) chloride.

4. A method according to claim 1, wherein the electrolyte comprises aluminium (III) sulphate.

5. A method according to claim 1, wherein the composition further comprises an anionic polyelectrolyte.

6. A method according to claim 1, wherein the composition further comprises a cationic polyelectrolyte.

7. A method according to claim 1, wherein the composition further comprises a clay.

8. A method according to claim 7, wherein the clay is bentonite or kaolinite.

9. A method according to claim 1, wherein the composition further comprises an organic titanate.

10. A method according to claim 1, further ng a component to maintain the pH of the water to which the composition is added.

11. A method according to claim 10, wherein the said component is calcxium hydroxide or calcium carbonate.

12. A method according to claim 1, wherein the compostion is added to the water to be treated in two doses, the amount of the second dose being graer than the amount of the first dose.

13. A method as claimed in claim 12, in which the amount of the second dose is at least 20 times greater than the amount of the first dose.

14. A method according to claim 1 wherein said water comprises soft water.

* * * * *